United States Patent [19]

Kreuzer

[11] 3,798,346
[45] Mar. 19, 1974

[54] POWER TRANSMISSION APPARATUS, ESPECIALLY CABLE AND CABLE BUS HOUSINGS

[75] Inventor: Julius E. Kreuzer, Sewickly, Pa.
[73] Assignee: Midland-Ross Corporation, Cleveland, Ohio
[22] Filed: Apr. 16, 1973
[21] Appl. No.: 351,294

[52] U.S. Cl............... 174/15 C, 174/16 B, 174/27, 174/103
[51] Int. Cl. ............................................. H01b 7/34
[58] Field of Search........ 174/16 B, 15 C, 15 R, 27, 174/68 B, 103

[56] References Cited
UNITED STATES PATENTS

| | | | |
|---|---|---|---|
| 2,107,031 | 2/1938 | Evans.............................. | 174/15 C |
| 3,102,740 | 9/1963 | Plummer........................... | 174/15 C |
| 3,409,731 | 11/1968 | Fink et al........................ | 174/15 C |
| 3,621,108 | 11/1971 | Cleaveland....................... | 174/15 C |
| 3,681,509 | 8/1972 | Johnston et al................... | 174/15 C |

Primary Examiner—Harold Broome
Assistant Examiner—A. T. Grimley

[57] ABSTRACT

Cables of round cross section, e.g., circular or ovate, and a cable bus housing assembly therefor are disclosed wherein the housing assembly is based essentially on similar panels which may be connected together into two opposed series of end-to-end connected panels. Normally, a plurality of cables are received between the panels with the opposed series secured together to cause substantial contact of concave surfaces of the panels with the peripheral surfaces of the cables. The housing assembly is designed especially for conducting heat out of the enclosed electrical conductors and dissipating the heat to the surrounding atmosphere by radiation and convection.

5 Claims, 5 Drawing Figures

PATENTED MAR 19 1974 3,798,346

POWER TRANSMISSION APPARATUS, ESPECIALLY CABLE AND CABLE BUS HOUSINGS

BACKGROUND OF THE INVENTION

In electrical transmission of local nature, such as within an industrial plant, electrical energy is normally transmitted in insulated copper or aluminium cables which may be subjected to such loads as to casue sufficient heating and temperature rise in the cable as to damage the insulation material. It is always possible to increase the size of the conductors to obtain cooler cable temperatures but, as copper or aluminum are expensive, the added cost of conductors of increased size becomes a matter of economic concern. It is known that the rating of cables may be increased by drawing off heat through metal sheathing in tight contact with the outer surface of the insulating layer of insulated cables. The prior art does not indicate that this principle has been appreciated or exploited to the extent herein disclosed.

It is an object of this invention to provide electrical power transmitting apparatus comprising insulated cables of relatively inexpensive construction in combination with cable bus housing components of simple construction capable of protecting the cable from physical injury and such overheating as would injure the cable insulation.

An object ancillary to the foregoing object is to provide cable bus housing structure that meets with American National Standards Institute National Electrical Code, e.g., structure that spaces the cable conductors at least one cable diameter apart.

A further object is to provide cable housing components of such design as to be easily attached to building structure and assembled in conjunction with the other elements of the above mentioned power transmitting apparatus by a single worker, if need be.

It is another object to provide a cable bus system which hsa electrical conductive continuity in order to function for equipment grounding.

SUMMARY OF THE INVENTION

The invention is concerned with a combination of electrical insulated cable conductors of round or oval cross section with a cable bus housing assembly which characteristically comprises thin-walled panels, preferably of metal, which may be assembled into opposed end-to-end series thereof with the cables supported therebetween. As shown in FIGS. 1 to 4, each panel is of unit sheet construction comprising a plurality of narrow flat parallel sections located substantially in a common plane, and a section of arcuate cross section for each cable received by the housing extending between and joined to each pair of adjacent flat sections. The arcuate sections are similarly arched with respect to the plane of the flat sections. The housing assembly is assembled in opposed pairs of the panels to locate inner concave surfaces of the arcuate sections of one panel in directly opposed relation with corresponding concave surfaces of the opposed panel whereby a cable may be received between each pair of opposed concave surfaces. Opposed concave surfaces are of a size and shape in relation to the peripheral surface of said cable to engage a preponderant portion of the cable surface without engagement of adjacent opposed flat sections. Opposed pairs of the panels are secured together by bolts or other fasteners and the degree of contact between the panels and the cables is dependent, in a preferred embodiment, to some extent on the flexibility of the material forming the panels. Bolts or other adjustable fastening means draw the panels together by extending between opposed flat sections and preferably through slots and holes thereof to bear on the outer surfaces of such sections. Fastening means for joining the panels within each series in end-to-end relationship may take the form of securing together overlapping end portions of adjacent panels, or through joints comprising utilization of conforming butt-strap pieces in overlapping relation with abutted end portions of adjacent panels with fastening means extending through such joints to effect joint connection.

BRIEF DESCRIPTION OF THE DRAWING

In the drawing with respect to which the invention is described.

DESCRIPTION OF PREFERRED EMBODIMENT

Figure 3:
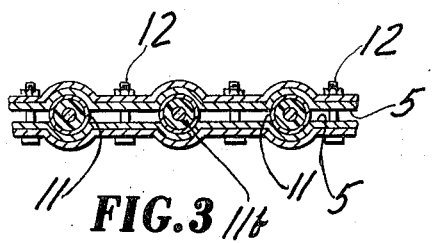
FIG. 3 is a cross section of cables and housing elements as taken along a plane III—III of FIG. 1.
Figure 1:
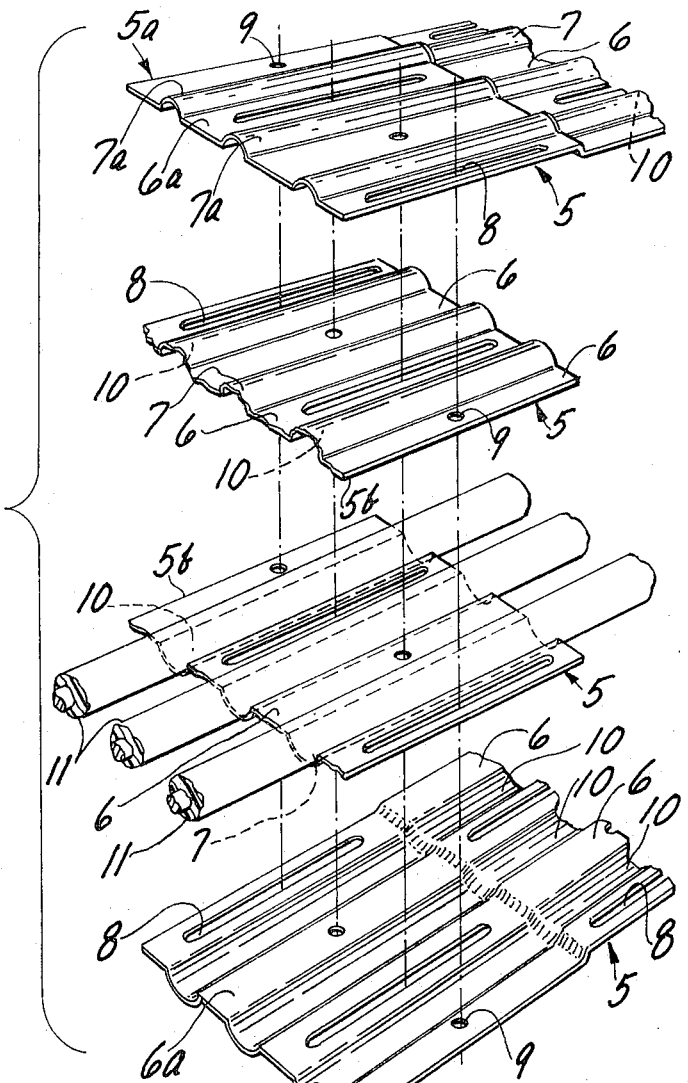
FIG. 1 is a fragmentary perspective exploded view of cables and panel end portions of cable bus housing panels which are normally secured together in tightly compacted condition over the cables as shown in FIG. 2.
Figure 2:
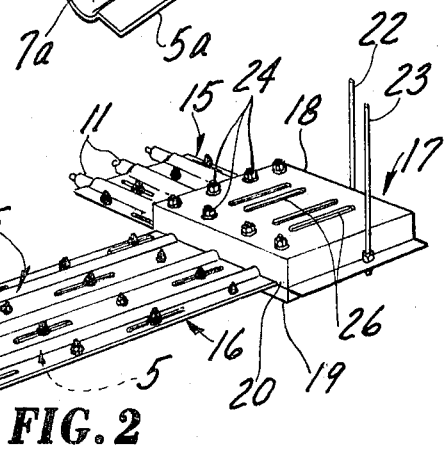
FIG. 2 is a perspective view of cables and cable bus housing components defining a right-angle turn in an electrical transmission system.

FIGS. 1 to 3 are various views of an arrangement of cable bus housing components utilizing a type of housing panel 5 which has an enlarged swaged end portions 5a specially shaped for forming the outer portion of a telescoping joint with end portions of adjacent housing panels in end-to-end connection therewith. As shown in FIG. 2 and in exploded view in FIG. 1, the remainder of the panel 5 is of uniform cross section, including the opposite end portion 5b.

FIGS. 1 to 3 show that each panel 5 comprises a plurality of narrow flat parallel sections 6 located along a common plane of the panel, and a plurality of sections 7 of arcuate cross section, each of which extends between each pair of adjacent flat sections 6 and continuously connects with such adjacent flat sections. In the swaged end portion of each panel the flat and arcuate sections 6a and 7a respectively are slightly offset in a direction perpendicular to the plane of the flat sections and slightly reshaped with respect to sections 6 and 7 so as to be complementary to the outer surfaces of sections 6 and 7. As shown, the flat sections 6, 6a have slots 8 and holes 9 in alternate arrangement lengthwise of each flat section. The spacings of the holes and slots are such that equal increments of the length of each flat section has either a hole or a slot centered within each increment. The holes and slots of adjacent flat sections are arranged so that each slot and the transversely opposite hole of the next adjacent flat section are centered along a transverse axis. Hence, in the transverse direction of the panel, the holes and slots occur in alternate relationship proceeding crosswise of the panel. It should be noted that the length of the slots may extend the full length of the above mentioned increments, or be greater or lesser than such length. The greater lengths are desired in the promotion of air currents through the cable bus housing assemblies described herein. However, the length of the slots may be limited for the attainment of satisfactory rigidity and to prevent the flat sections 6 from becoming more flexible than desired in the attainment of good contact of the arcuate sections with cable insulation.

In the practice of the invention, a pair of panels is placed in coextensive opposing relationship with the concave surfaces 10 of one panel opposing those of the opposed panel to form generally cylindrical regions for receiving cables 11 of rounded, e.g., circular or ovate, cross section. It is an important feature of this invention to use the panels 5 herein described in combination with electrically conducting cables of rounded cross section of which the curvature of their outer surfaces is closely similar to respective circumscribing concave surfaces 10. As FIG. 3 illustrates, the concave surfaces do not cover the entire outer surfaces of the cables as evidenced by the space between opposing panels 5. The percentage of the outer surfaces of the cables engaged is substantial and should be in the order of 25 to 60 percent or more. Extent of contact between the surfaces 10 and the cables will vary to some extent in accordance with the outer circumference of the cable since a panel system in accordance with this invention of specific construction will be suitable for use with a small range of standard cable sizes.

As the insulating material 11b of the cable is in every case somewhat resilient, approximate matching of the cable periphery with the concave panel surfaces 10 results in approximately 100 percent contact of the concave surfaces with immediately underlying cable surfaces. Due to the yield of the cable insulation and flexibility of the panels when fasteners, such as the bolts 12, are adjusted to exert a desired draft force between the opposing panels, use should be made of holes and slots of opposed panels in registry to maximize contact of the cables and the panels in dissipating heat from the conductor portions of the cables. In order that the cable bus housing system herein described by cooled by ventilation as intended, it is preferable that an appreciable gap be maintained between the flat sections 6 so that air may circulate through assembly by passing from slot to slot of opposed panels. Thus a desirable relationship is maintained between the shape of panels and the size of the cable supported therein to maintain an air-conducting gap or clearance region between opposing panels.

Various types of rapid-attachment fasteners and equipment for applying such fasteners are known to the sheet metal industries which are suitable for securing the cable and panel assembly together described herein. It will be noted that the panels of the embodiment of FIGS. 1 to 3 are identical and that when one panel is in inverted relation with respect to the other and superimposed thereover, the slots 8 of one panel are located in registry with the holes 9 of the other panel. This arrangement permits minor adjustability of the panels relative to each other and eliminates any difficulties of passing fasteners through superimposed panels because of mismatching of openings.

FIG. 2 illustrates a right-angle portion of an assembled conductor cable and cable bus housing system wherein panel assemblies 15, 16 protrude into a box housing 17 comprising upper and lower halves 18, 19. The halves are suitably apertured along a parting line 20 to fit around the end portions of assemblies 15, 16. The housing portions 18, 19 are secured together over the received panel assembly portions by threaded hanger rods 22, 23 with securing nuts thereon and bolts 24 which extend through the panel portions received inwardly of the housing 17 and also through the housing halves 18, 19 and act thereon to draw them together.

Cables 11 may be spliced inwardly of the housing 17 along portions thereof protruding from the panel assemblies. It is permissible for short length portions of the cables 11 to be supported without coverage by the panels 5 since heat generated in such short portions will tend to follow the cable toward the portions enclosed by the cable bus housing panels. For dissipation of heat from the box housing 17, the upper and lower halves thereof may be provided with louvres, such as louvres 26.

Figure 4:
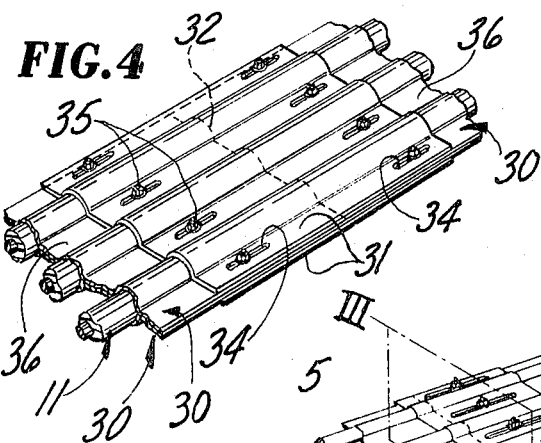
FIG. 4 is a fragmentary perspective view illustrating an end-to-end joint connection of cable bus housing panels comprising lap joint elements.

FIG. 4 illustrates panels 30 which may be constructed to uniform cross section throughout their lengths to avoid provision of swaged joint- forming portions such as panel portions 5a of FIG. 1. Adjoining pairs of superimposed panels 30 are then joined by two coupling or butt-strap pieces 31 which are formed in transverse cross section similarly to swaged panel end portions 5a to conform to the outer surfaces of opposed panels 30 when adjacent pairs of the panels 30 meet along a parting line 32. Coupling pieces 31 are preferably formed with short slots 34 in longitudinally spaced registry over holes and slots of the abutting housing panels 30. Fasteners 35 then extend through holes and slots of the panels 30 and through the slots of the opposing coupling members 31. The fasteners are then adjusted to attain the desired spacing of opposed flat sections 36 of the members 30 somewhat as shown in FIG. 3. Under some conditions, the connection of end-to-end pairs of panels may be satisfactorily made in joints which include but one coupling piece 31 instead of two as shown.

Figure 5:
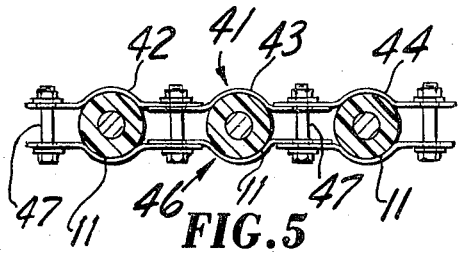
FIG. 5 is a diagrammatic cross section of a cable bus system and cables wherein the cable enclosing panels are of articulated construction.

FIG. 5 illustrates a cable bus system 40 wherein the opposite panels are not integral as shown in the embodiments described above but are of articulated construction. For example, the upper panel 41 consists of cable- embracing elements 42, 43 and 44. As shown, the panel 46 is of similar articulated construction. The assembly of elements is then tied together in cooperative enclosing relation with cables 11 by any suitable type of fastener, such as fasteners 47 shown diagrammatically. The elements 42, 43 and 44 may be of sheet metal stampings or thin-walled extrusions formed, e.g., from aluminum. The thin-walled panel components of the earlier described embodiments may also be formed of metal stampings or extrusions when the width is not impractical.

What is claimed is:

1. In combination with insulated cable conductors or rounded cross section, a cable bus housing assembly comprising a plurality of similar thin- walled panels adapted for assembly into opposed end-to-end series thereof, each panel comprising a plurality of narrow flat parallel sections located substantially in a common plane, and a section of arcuate cross section between each pair of adjacent flat sections for each cable received by said housing;

said assembly being assembled in opposed pairs of said panels to locate inner concave surfaces of said arcuate sections of one panel in directly opposed relation with corresponding concave surfaces of the opposed panel, each pair of opposed concave surfaces providing space for support of a cable therebetween and being of a size and shape in relation to the peripheral surface of said cables to engage a preponderant portion of its surface without engagement of adjacent opposed flat sections of opposed panels;

means extending between opposed pairs of flat sections for joining opposed panels together; and means for joining said panels in end-to-end relationship.

2. The combination of claim 1 wherein:

said flat sections are formed with holes and slots in alternate uniformly spaced relationship along the full length of each panel; and in the lateral direction of the panel the holes in the various flat sections are in alternating relation with the slots of alternate flat sections.

3. The combination of claim 1 wherein:

each of certain panels has an enlarged swaged end portion providing a surface facing inwardly of said assembly which conforms to the outward facing surface of its opposite end portion adapting the panel to connect in end-to-end overlapping relation and precise linear alignment with a longitudinally adjacent panel having its unswaged end portion in linearly complementary relation with said swaged portion.

4. The combination of claim 1 wherein said panels are of uniform transverse cross section and said means for joining the panels in end-to-end relationship comprises:

coupling pieces having inwardly facing surfaces conforming to surfaces of end portions of said panels facing outwardly of said assembly, said pieces having apertures adapted for registry with holes and slots of end portions of panels in end-to-end relation; and fastening means extending through said apertures and holes and/or slots in registry therewith to secure end-to-end panels together.

5. A cable bus housing assembly for insulated cable conductors of rounded cross section comprising a plurality of similar thin-walled panels adapted for assembly into opposed end-to-end series thereof, each panel comprising a plurality of flat parallel sections located substantially in a common plane, and a section of arcuate cross section located between each pair of adjacent flat sections for each cable received by said housing, said arcuate section being continuously connected with the adjacent flat sections;

said assembly being assembled in opposed pairs of said panels to locate inner concave surfaces of said arcuate sections of one panel in directly opposed relation with corresponding concave surfaces of the opposed panel, each pair of opposed concave surfaces providing space for support of a cable therebetween and being of a size and shape in relation to the peripheral surface of a cable for use therewith to engage a preponderant portion, but not all, of the peripheral surface of the cable to avoid engagement of adjacent opposed flat sections of opposed panels;

said flat sections having openings for the circulation of air through the assembly;

means extending between opposed pairs of flat sections for joining opposed panels together into tight engagement with any cables received between the concave surfaces thereof; and means for joining said panels into end-to-end relationship.

* * * * *